(12) United States Patent
Unmuth et al.

(10) Patent No.: US 8,408,618 B2
(45) Date of Patent: Apr. 2, 2013

(54) GRIPPING PLIERS

(75) Inventors: Thomas Unmuth, Stuttgart (DE); Robert Steinebrunner, Todtnau (DE)

(73) Assignee: Zahoransky AG, Todtnau (DE)

( * ) Notice: Subject to any disclaimer, the term of this patent is extended or adjusted under 35 U.S.C. 154(b) by 125 days.

(21) Appl. No.: 12/775,040

(22) Filed: May 6, 2010

(65) Prior Publication Data

US 2010/0289286 A1 Nov. 18, 2010

(30) Foreign Application Priority Data

May 14, 2009 (DE) .......................... 10 2009 021 558

(51) Int. Cl.
*B66C 1/42* (2006.01)
(52) U.S. Cl. ...................................... 294/99.1; 294/106
(58) Field of Classification Search ............... 294/86.4, 294/192, 106, 198, 87.22, 99.1, 902, 119; 901/31, 37, 39; 254/18, 22, 24; 269/43, 269/3, 6
See application file for complete search history.

(56) References Cited

U.S. PATENT DOCUMENTS

| | | | | |
|---|---|---|---|---|
| 2,226,789 | A * | 12/1940 | Tupy | 294/106 |
| 3,139,302 | A * | 6/1964 | Orloff et al. | 294/198 |
| 4,819,978 | A * | 4/1989 | Scheinman et al. | 294/119.1 |
| 5,819,386 | A * | 10/1998 | Koppe | 29/261 |
| 5,924,679 | A * | 7/1999 | Wilson | 254/18 |
| 6,042,166 | A * | 3/2000 | Conte | 294/202 |
| 2009/0108605 | A1 * | 4/2009 | Becker et al. | 294/88 |

* cited by examiner

*Primary Examiner* — Dean Kramer
*Assistant Examiner* — Stephen Vu
(74) *Attorney, Agent, or Firm* — Volpe and Koenig, P.C.

(57) ABSTRACT

Gripping pliers (1) are provided for grasping and holding an object. The gripping pliers include at least two gripping jaws (2), movable in reference to each other, along with a drive for an opening and closing motion of the gripping jaws (2). At least one of the gripping jaws (2) includes several fingers (3), arranged side-by-side in reference to each other with each being individually adjustable against a restoring force, approximately in an opening and closing direction. The gripping jaws (2) are each embodied in one piece with their respective fingers.

14 Claims, 3 Drawing Sheets

GRIPPING PLIERS

CROSS-REFERENCE TO RELATED APPLICATIONS

This application claims the benefit of German Patent Application No. 10 2009 021 558.1-15, filed May 14, 2009, which is incorporated herein by reference as if fully set forth.

BACKGROUND

The invention relates to gripping pliers for grasping and holding an object, having at least two gripper jaws, movable in reference to each others, and having a drive for an opening and closing movement of the gripping jaws, with at least one of the gripping jaws comprising several fingers, arranged side-by-side to each other, each individually adjustable approximately in the opening and closing direction against a restoring force.

Such gripping pliers are known in numerous embodiments and are used to move objects from one place to another. For example, tooth brushes can be moved from a processing device or a brush storage area to a processing device arranged downstream. The range of application of such gripping pliers is not limited to the production of brushes, however.

The object to be grasped is here held in a clamping fashion between opposite gripping jaws. Here, it is problematic that depending on its design the object may lean laterally during the gripping process and thus perhaps cannot be put down in the desired position. In order to solve this problem, two gripping pliers or one set of gripping pliers with two pairs of gripping jaws can be used, tightly holding the object at several positions. This is subject to high costs, though, and due to the higher weight of twice the number of gripping jaws to be moved the operating speed is reduced.

Alternatively, gripping pliers may be used comprising one gripping jaw with a gripping finger and an opposite gripping jaw with two gripping fingers. Using such a three-point system an object may be held in a better fashion, however here too, there is the risk that the object, for example a tooth brush with a curved brush body, rotates within the gripping pliers, which in turn aggravates the placement of the object, for example in a stacking magazine.

In order to address the problem that the object may become damaged when the gripping jaws engage it with excessive force, it is already known in practice for gripping pliers to have gripping jaws comprising several fingers, each of them individually adjustable against a restoring force.

Particularly in profiled objects, there is the problem in simpler gripping pliers that the object is impinged by a gripping jaw with an insufficient holding force at one point and at some other points no contact occurs between the object and the gripping jaw. When increasing the holding force the gripping jaw may be made to approach the sections of the object initially not grasped. However, here the pressure upon those sections of the object increases, which already were in contact with the gripping jaws at an earlier time. In this manner, pressure points or damages can develop at the object. Such pressure impingements of the object are to be avoided, in particular when using gripping pliers in food processing.

By the further developed gripping pliers having individually adjustable fingers, the gripping jaws for grasping an object can be made approaching each other, with in case of a profiled object, for example the body of a tooth brush, the individual fingers can form to the object according to its external contour and with increasing holding force be deflected individually against the restoring force such that the object, on the one side, is held at each point within the grasping range, on the other side, there is no point at which an excessive pressure acts upon the object such that it could be damaged or that pressure points could form. The individual fingers can here be deflected to a different extent according to the contour of the object. This allows a secure and reliable holding of an object in a defined position having a holding force, which is sufficient to hold the object without damaging it thereby.

The gripping pliers known, and comprising individually adjustable fingers, are expensive, though, in their production because each finger must be mounted individually. This renders their production more expensive. Additionally, the gripping jaws comprise a relatively high weight by the required connection elements for an adjustable mounting of the fingers, which limits the maximally possible processing speed of the gripping pliers.

SUMMARY

Therefore, the object is to provide gripping pliers of the type mentioned at the outset, by which an object can safely be grasped and held without any risk of damaging the object and which can be produced in a simple and cost-effective manner.

This object is attained according to the invention by providing the gripping jaws each being embodied in one piece with its fingers.

By the one-piece embodiment of the entire gripping jaw with all its fingers, no expensive assembly of the individual fingers at a base area is required and the production of the gripping pliers can therefore be manufactured quickly and cost-effectively. Additionally, the gripping jaws are embodied in a particularly stable fashion, because no connection points exist that could loosen. Furthermore, the gripping jaws show a low weight so that higher transportation and processing speeds are possible.

Here, a preferred embodiment comprises that the gripping jaws are molded parts produced in a Laser-sintering process. In this process, even complex, one-piece work pieces can be manufactured in a simple and cost-effective fashion. Due to the gripping jaws being made entirely from plastic they show a low weight and the gripping pliers can be moved quickly.

Depending on the type and design of the object to be held it may be sufficient if only one of the gripping jaws comprises individually adjustable fingers. However, preferably all gripping jaws comprise individually adjustable fingers. This way, an even safer grasping and holding is possible without risking to damage an object.

A preferred embodiment provides for the fingers each to be held via spring-elastic material sections at a base area of the gripping jaw. This way, by a simple design the adjustability against a restoring force can be achieved for the fingers, which reduces the production costs for the gripping jaws.

The spring-elastic material sections can each be embodied linearly or preferably approximately arc-shaped.

In order to prevent any excessive deflection of the fingers and thus an accidental breaking of the spring-elastic material section it is beneficial if a stop element to limit the deflection path is allocated to each of the fingers. This deflection limit can be effective in both directions, so that the fingers are protected from an excessive deflection during the use of the gripping pliers as an internal as well as an external claw.

Preferably the stop elements are molded sections of the one-piece gripping jaw. Here, the stop elements can each interfere with an engagement area of the one-piece gripping jaw limiting its deflection path.

This way, no separate elements are necessary for the deflection limits, which need to be mounted to the gripping pliers, requiring an expensive assembly and which would increase the weight of the gripping jaws. Due to the fact that the elements of the deflection limit are part of the one-piece gripping jaw, they are directly formed during the production of the gripping jaw.

The gripping jaw can each be held pivotally or linearly displaceable at a support part.

Here, it may be advantageous if the gripping jaws can each be connected to the support part in a detachable fashion. This allows the gripping jaws to be provided for the processing of different objects by exchanging the gripping jaws. Additionally, a gripping jaw can quickly be exchanged in case of damage, for example by wear and tear.

In order to avoid excessive impact of force upon the object to be held by any excessive approach of the gripping jaws towards each other, which may no longer be compensated by the adjustable fingers, it may be beneficial for a limit for the adjustment travel to be provided for the gripping jaws, at least in their closing direction.

In order to form a limit for the adjustment travel of the gripping jaws at least one stop area may be provided at each of them, which cooperates with a stop area of an opposite gripping jaw. When reaching a maximum closing position the stop areas contact each other and thus prevent any further approaching of the gripping jaws towards each other.

These stop area are located in the area of the one-piece gripping jaws, so that separate elements are not necessary.

For simply shaped objects the fingers may each be embodied identically.

In order to grasp and hold more complexly formed objects it may be beneficial, though, if the fingers are embodied differently and show at their contact areas some profiling and/or different widths adjusted in their shape to the object to be held.

Here, each finger may comprise three-dimensionally shaped profiling, adjusted in its shape to the respective section of the object that is contacted when the respective finger holds it, so that even in strongly profiled objects none of the fingers are deflected excessively against the restoring force or the risk develops that individual fingers cannot follow the deflection necessary due to their limited deflection. The number of contacting sites between the fingers and the object in reference to non-profiled fingers is increased by a multitude, in the ideal case the fingers contact the object over the entire surface such that the risk of pressure points at the object is further reduced. Here, the fingers may also be embodied with different widths to well reflect complex profiling.

Usually the gripping pliers approach the object to be grasped from above. In order to avoid that the object and/or the gripping pliers themselves are damaged by a faulty positioning when the gripping pliers are lowered to the object and the free ends of the fingers impinge it here, it is advantageous for the gripping pliers to show an effective elasticity in the direction of the positioning motion towards the object to be grasped. When the fingers impinge the object and the gripping pliers further approach the object, for example because the object was not exactly located in the predetermined position, the gripping pliers can elastically retreat and thus minimize the force impinging the object via the gripping pliers. This way, damaging the object or the pliers themselves can be avoided.

For a universal alignment of the gripping pliers, for object provided in different alignments, or in order to reposition objects in a different alignment it is beneficial for a rotary drive to be provided for the gripping pliers.

Preferably, gripping pliers comprise two gripping jaws positioned opposite each other. However, different embodiments are also possible, for example a three-point grasper, in which a one gripping jaw is opposed by two other gripping jaws, positioned at a distance and off-set in reference to each other.

BRIEF DESCRIPTION OF THE DRAWINGS

In the following, exemplary embodiments of gripping pliers according to the invention are explained in greater detail using the drawings.

In the drawings.

DETAILED DESCRIPTION OF THE PREFERRED EMBODIMENTS

Figure 1:
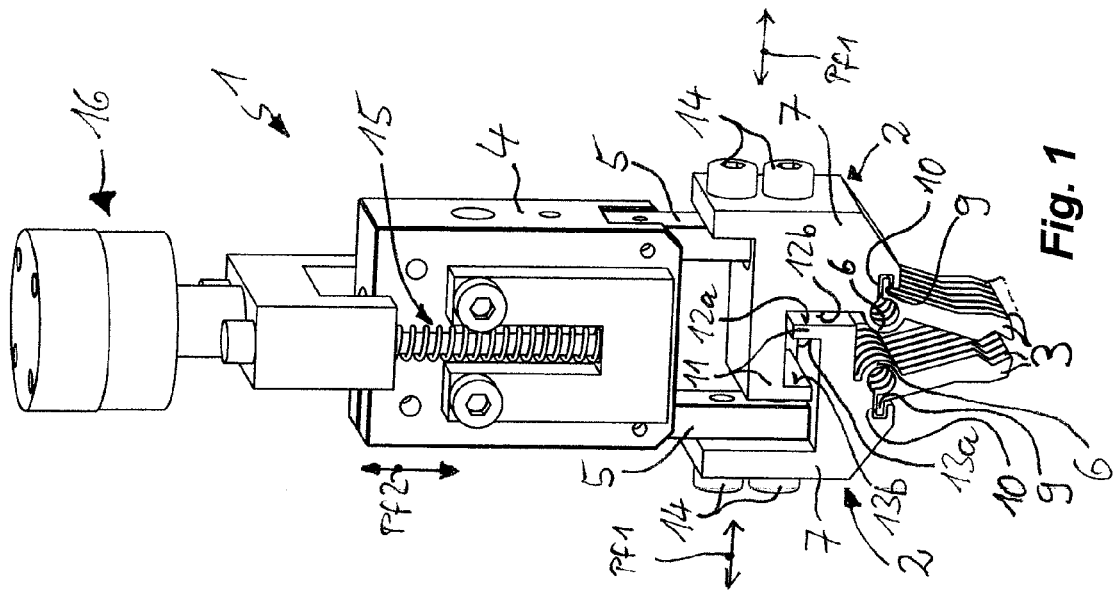
FIG. 1 is a perspective view of the gripping pliers according to the invention.

Gripping pliers for grasping and holding an object, not shown, are marked 1 in their entirety, and comprise gripping jaws 2, opposite and movable in reference to each other, according to FIGS. 1 through 6. Using a drive, not shown in greater detail, the gripping jaws 2 are linearly movable between an opening and a closing position (arrows Pf1, FIG. 1.) For this purpose the gripping jaws 2 are each supported via a connection arm 5 on a support part 4.

The gripping jaws 2 each represent plastic parts formed in one piece, which may be produced in a plastic Laser-sintering process, in particular. In this manner, the gripping jaws 2 can be easily produced and show high stability with a low weight.

The two gripping arms 2 each comprise several fingers 3, arranged side-by-side, each of which is adjustable against a restoring force. For this purpose, the fingers 3 are each held via an approximately arc-shaped, spring-elastic material section 6 at a base section 7 of the gripping jaw 2 (FIGS. 1, 2, 4, 5, 7, 8.) As particularly discernible from the perspective views according to FIGS. 1 and 4 as well as the detailed illustration of a gripping jaw 2 according to FIG. 7, each finger 3 comprises a separate spring-elastic material section 6 such that each finger 3 can be deflected separately, independent from the level of deflection of the other fingers 3. This way it is possible to grasp profiled objects, for example the bodies of brushes, and to hold them, with the individual fingers 3 being deflected to a different degree corresponding to the profiling of the object, and the object, on the one hand, is impinged at all sides and held securely, on the other hand, at no point the impingement of force and pressure upon the object is of such an extent that the object is damaged or pressure points remain on it.

Figure 7:
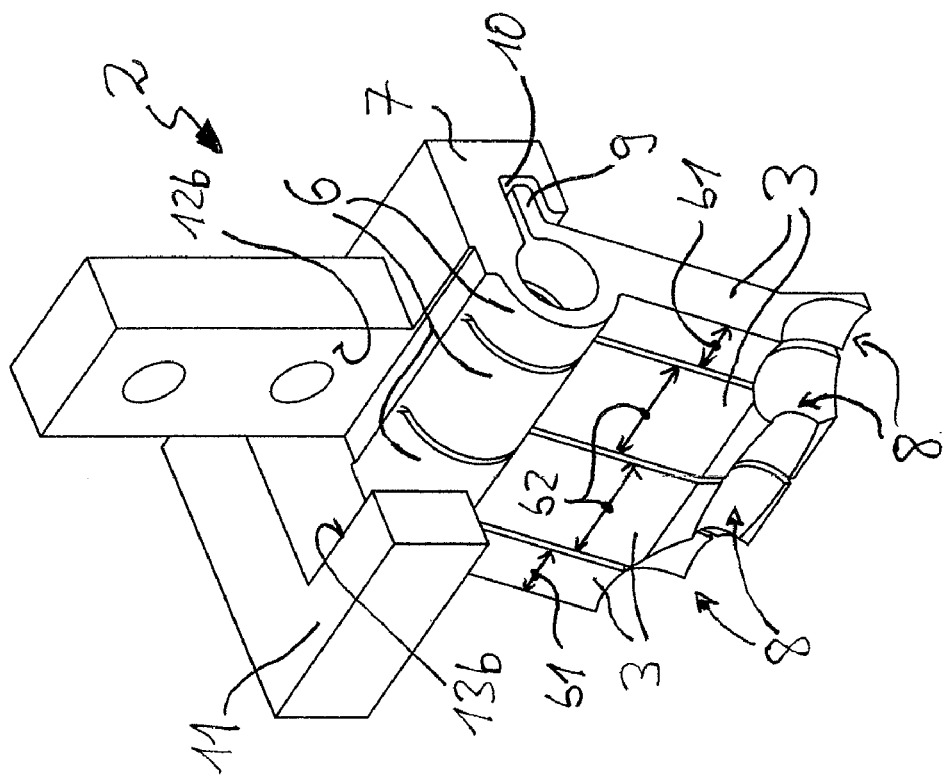
FIG. 7 is a perspective view of a gripping jaw having profiled fingers.
Figure 8:
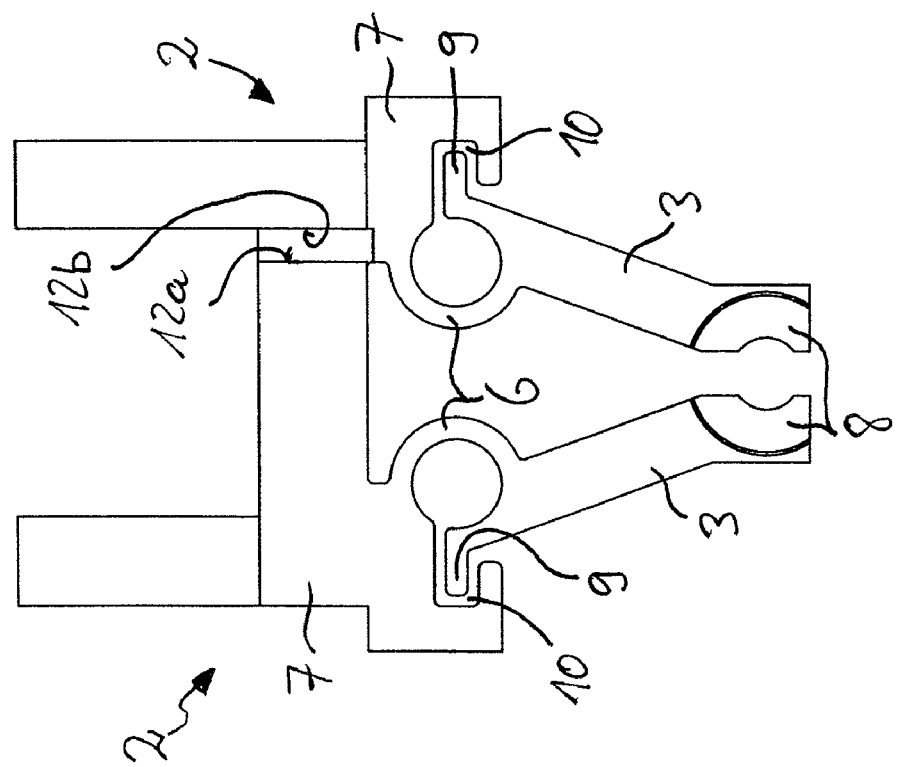
FIG. 8 is a side view of a pair of gripping jaws according to the gripping jaw of FIG. 7.

This improved holding of the object can be further optimized, as shown in FIGS. 7 and 8, if the fingers 3 are embodied differently and their impinging areas include a profiling 8 adjusted in a form-fitting fashion to the object to be held, which can contact the object in a form-fitting fashion. In FIG. 7 it is discernible that the fingers 3 also comprise different widths (b1, b2).

In order to avoid the fingers 3 becoming damaged by an excessive deflection, at the base area 7, a contact area 10 each is provided, having an approximately U-shaped cross-section, with the fingers 3 of the respective gripping jaw 2 engaging them with one stop element 9 each. When reaching the maximally permissible deflection angle in one or the other direction, the stop element 9 contacts one side of a contact area 10 and this way any further deflection is prevented.

A limit for the deflection travel is also provided for the gripping jaws 2 themselves. For this purpose the gripping jaws 2 each include L-shaped sections 11, engaging each other.

In order to limit the deflection travel in the closing direction, the exterior of a free L-leg of a gripping jaw 2 cooperates as the contact surface 12a with a contact surface 12b of the other gripping jaw 2 (FIGS. 1, 2, 4, 5).

Due to the sides of the free L-legs of the L-shaped sections 11 of the gripping jaws 2, facing each other and serving as stop areas 13a, 13b, a limit for the deflection travel of the gripping pliers 1 is formed in the opening direction.

As particularly discernible from the FIGS. 1, 2, 4, 5, 7, and 8, the limits for the deflection travel with their corresponding elements 9, 10, 11, 12a, 12b, 13a, 13b are components of the gripping jaws 2 each embodied in one piece. The overall functionality of the limits for the deflection travel of the fingers 3 and the gripping jaws 2 as well as the deflective potential of the fingers 3 is simply given by the gripping jaw 2, embodied in one piece, without requiring that separate elements must be mounted to the gripping jaw 2 or the gripping jaw 2 having to cooperate with a separate stop element, for example. The production of the gripping pliers 1 and the above-mentioned functionalities is therefore achieved in a particularly simple fashion.

Figure 2:
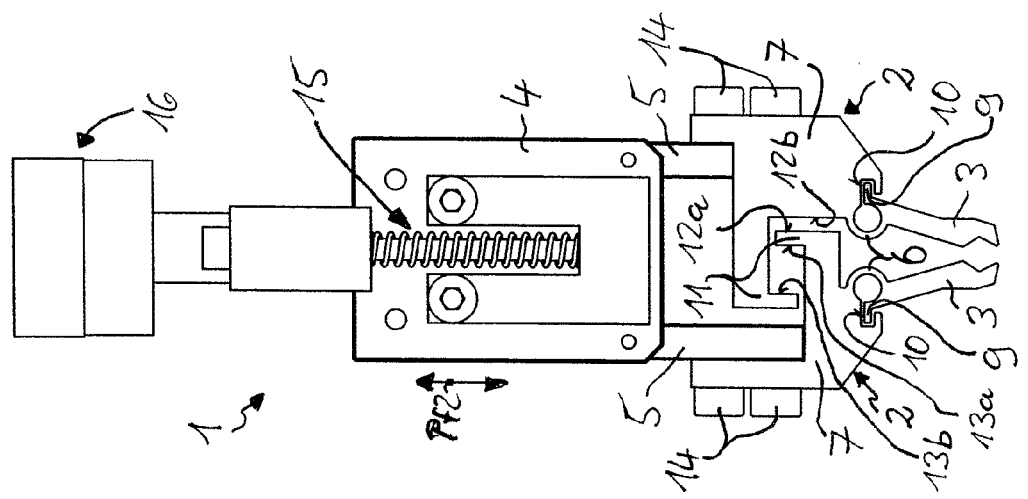
FIG. 2 is a front view of the gripping pliers of FIG. 1.
Figure 3:
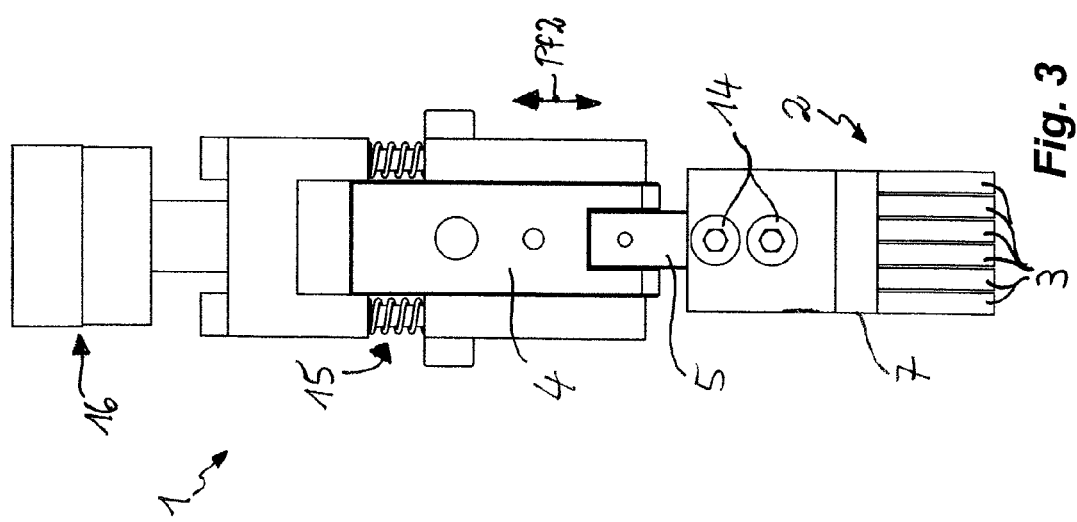
FIG. 3 is a longitudinal side view of the gripping pliers of FIG. 1.
Figure 4:
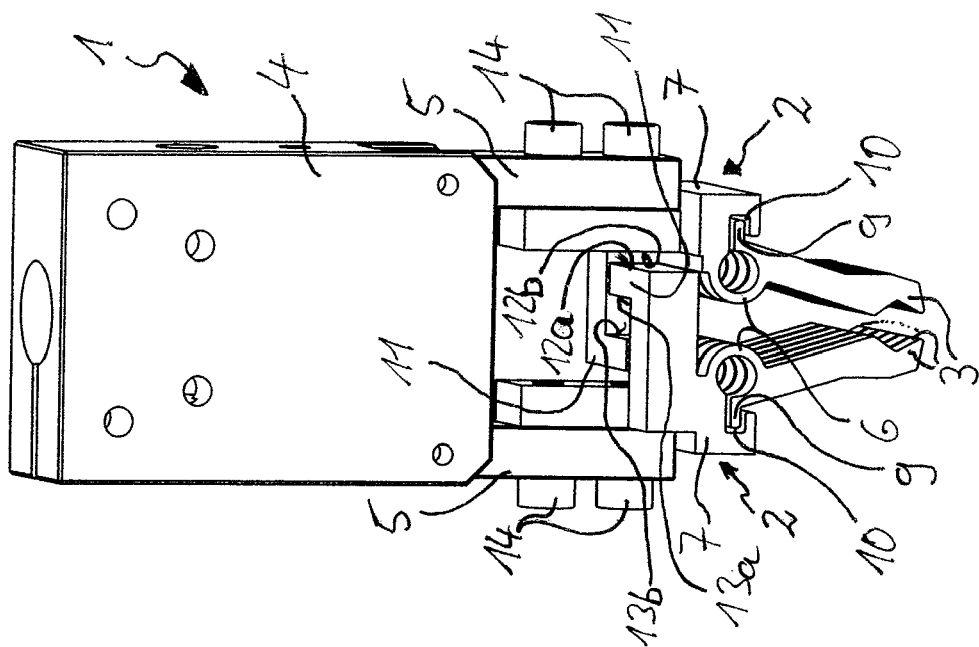
FIG. 4 is a perspective view of another embodiment of the gripping pliers.
Figure 5:
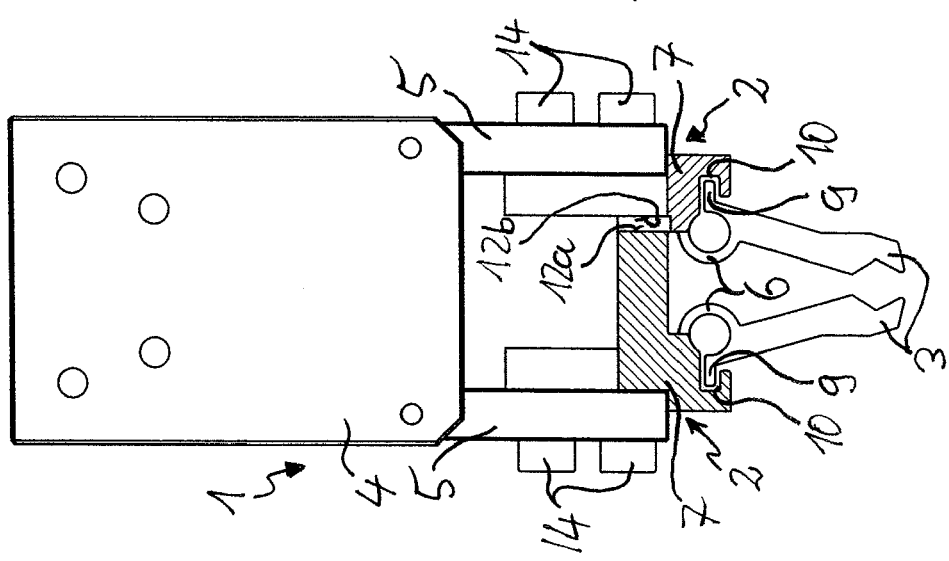
FIG. 5 is a cross-sectional view of the gripping pliers of FIG. 4.
Figure 6:
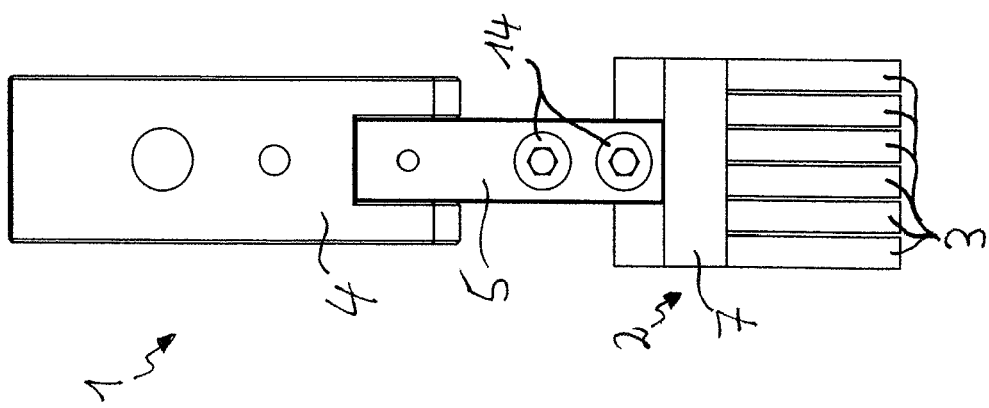
FIG. 6 is a longitudinal side view of the gripping pliers of FIGS. 4 and 5.

In the gripping pliers 1 according to the FIGS. 4 through 8 it is advantageous in reference to the embodiment according to FIGS. 1 through 3 that the two gripping jaws 2 are embodied identically and, due to the installation at the support part 4, rotated by 180°, the L-shaped sections 11 take the position necessary to allow the limited deflection travel. Therefore only one variant of gripping jaws is necessary, which facilitates the production and assembly and thus also reduces the production costs.

The gripping jaws 2 can each be connected to the support part 4 of the gripping jaw 1 via screws 14 in a detachable fashion. In this way, the gripping jaws 2 can be exchanged quickly and easily, for example to prepare the gripping pliers 1 to grasp a different object.

The gripping pliers 1 according to FIGS. 1 through 3 comprises a spring 15 effective in the direction of the positioning motion (Pf2) towards the object to be grasped. This way, the support part 4 with the gripping jaws 2 can elastically retreat, when the fingers 3 meet a stop, for example when the gripping pliers 1 were positioned in a faulty fashion or when an object to be grasped was incorrectly positioned and the fingers 3 are pressed against it. Damages of the gripping pliers 1, on the one side, as well as the object can be avoided this way. In the gripping pliers 1 according to the FIGS. 1 through 3, the elasticity 15 is formed by a compression spring.

FIGS. 1 through 3 also show a rotary drive 16 for the gripping pliers 1, by which the gripping jaws 2 can be positioned in a rotary fashion in order, for example, to securely grasp objects arranged in different alignments or to put down objects in an alignment differing from the one they were picked up from.

The invention claimed is:

1. Gripping pliers (1) for grasping and holding an object, comprising at least two gripping jaws (2), movable in reference to each other, a drive that moves the gripping jaws in an opening direction and a closing direction, at least one of the gripping jaws (2) comprising more than two fingers (3), arranged side-by-side and the fingers on the gripping jaw (2) are movable together in the opening and closing directions, and each of the fingers is individually adjustable against a restoring force that acts approximately in the opening or the closing direction, the gripping jaws (2) are each formed in one piece with the respective fingers (3), each of the gripping jaws (2) comprises the fingers (3) that are individually adjustable, and the fingers (3) are each individually connected via a spring-elastic, restoring force generating material section (6) to a base area (7) of the gripping jaws.

2. Gripping pliers according to claim 1, wherein the gripping jaws (2) are Laser-sintered, molded parts.

3. Gripping pliers according to claim 1, wherein the spring-elastic material sections (6) each have an approximately arc-shape.

4. Gripping pliers according to claim 1, wherein a stop element (9) is allocated to each of the fingers (3) to limit a deflection travel.

5. Gripping pliers according to claim 4, wherein the stop elements (9) are formed sections of the one-piece gripping jaw (2).

6. Gripping pliers according to claim 5, wherein the stop elements (9) each engage a contact area (10) of the one-piece gripping jaws limiting the deflection travel.

7. Gripping pliers according to claim 1, wherein the gripping jaws (2) each are held in a pivotal or linearly displaceable fashion on a support part (4) of the gripping pliers.

8. Gripping pliers according to claim 1, wherein the gripping jaws (2) are each connected to a support part (4) of the gripping pliers in a detachable fashion.

9. Gripping pliers according to claim 1, wherein a limit for a deflection travel of the gripping jaws (2) is provided at least in a closing direction.

10. Gripping pliers according to claim 9, wherein the gripping jaws (2) each are provided with at least one stop surface (12a, 13a), cooperating with a stop surface (12b, 13b) of an opposite gripping jaw (2), as a limit for displacement travel.

11. Gripping pliers according to claim 1, wherein the fingers (2) of each of the gripping jaws are identical to one another.

12. Gripping pliers according to claim 1, wherein the fingers (3) are embodied differently and comprise at respective contact areas a profiling (8), adjusted in shape to the object to be held, and/or have different widths (b1, b2).

13. Gripping pliers according to claim 1, wherein the gripping pliers (1) include a spring (15) effective in a direction of a positioning motion normal to the opening and closing directions towards the object to be grasped.

14. Gripping pliers according to claim 1, further comprising a rotary drive (16) for rotational positioning of the gripping pliers (1).

* * * * *